US 9,594,469 B2

(12) United States Patent
Jakobs et al.

(10) Patent No.: US 9,594,469 B2
(45) Date of Patent: Mar. 14, 2017

(54) DYNAMIC LAYERING USER INTERFACE

(75) Inventors: Daniel Jakobs, Baden-Württemberg (DE); Niklas Baudy, Boehl-Iggelheim (DE)

(73) Assignee: SAP SE, Walldorf (DE)

( * ) Notice: Subject to any disclaimer, the term of this patent is extended or adjusted under 35 U.S.C. 154(b) by 362 days.

(21) Appl. No.: 13/557,662

(22) Filed: Jul. 25, 2012

(65) Prior Publication Data

US 2014/0033116 A1    Jan. 30, 2014

(51) Int. Cl.
| | |
|---|---|
| *G06F 3/0481* | (2013.01) |
| *G06F 17/30* | (2006.01) |
| *G09G 5/14* | (2006.01) |

(52) U.S. Cl.
CPC ...... *G06F 3/0481* (2013.01); *G06F 17/30958* (2013.01); *G09G 5/14* (2013.01)

(58) Field of Classification Search
CPC ........ G06F 3/0481–3/0488; G06F 5/14; G06F 17/30905; G06F 9/4443; G06F 3/048; G06F 17/30126; G06F 8/00; G06F 17/30958; G09G 5/14
USPC ........ 715/781, 782, 790, 791, 793, 802–804
See application file for complete search history.

(56) References Cited

U.S. PATENT DOCUMENTS

| | | | | |
|---|---|---|---|---|
| 6,657,644 | B1* | 12/2003 | Plow et al. ................. 715/786 |
| 8,091,039 | B2* | 1/2012 | Salvador ................ G06T 19/00 345/205 |
| 2004/0261037 | A1* | 12/2004 | Ording ................ G06F 3/0481 715/788 |
| 2006/0015818 | A1* | 1/2006 | Chaudhri ............ G06F 3/0481 715/779 |
| 2008/0195969 | A1* | 8/2008 | Brown et al. ................ 715/802 |
| 2009/0129739 | A1* | 5/2009 | Kato et al. ..................... 386/52 |
| 2011/0202834 | A1* | 8/2011 | Mandryk ............ G06F 3/04883 715/701 |
| 2011/0202837 | A1* | 8/2011 | Fong et al. .................. 715/702 |
| 2012/0022926 | A1* | 1/2012 | Ramanathan ........ G06F 3/0485 705/14.4 |
| 2012/0062576 | A1* | 3/2012 | Rosenthal ............... G09G 5/14 345/522 |
| 2012/0139918 | A1* | 6/2012 | Michail ............... G06T 15/503 345/421 |

* cited by examiner

*Primary Examiner* — Nicholas Ulrich
(74) *Attorney, Agent, or Firm* — Buckley, Maschoff & Talwalkar LLC

(57) ABSTRACT

A system, method, and medium, the method including generating a display environment having multiple layers, each layer containing at least one user interface element associated with the layer; and generating a viewport having a port that provides a visible view onto multiple the layers of the display environment.

18 Claims, 12 Drawing Sheets

DYNAMIC LAYERING USER INTERFACE

FIELD

Some embodiments relate to a display environment. More specifically, some embodiments relate to a display environment including a user interface having a plurality of layers.

BACKGROUND

The types of devices and systems now using graphical user interfaces include conventional computing systems and consumer devices such as portable multifunction devices. While the number and scope of devices and systems employing displays that present graphical user interfaces to a user may be growing, the user interfaces themselves tend to include a great deal of "sameness". That is, a great many of the current user interfaces provide a similar type of user interface experience.

As users become increasingly familiar with and exposed to the conventional user interfaces, these same users may tend to lose interest or focus on a device or system due, in part, to the "sameness" of the device or system's user interface. Some systems, applications, and services have attempted differentiate a user's experience using their device, system, or service by enhancing some aspects of the execution of their user interface. Such attempts have included altering colors of the user interface and/or providing faster rendering of aspects of the user interface. However, such attempts fail to fundamentally change, alter, or enhance the user interface in a dramatic manner.

DETAILED DESCRIPTION

Figure 1:
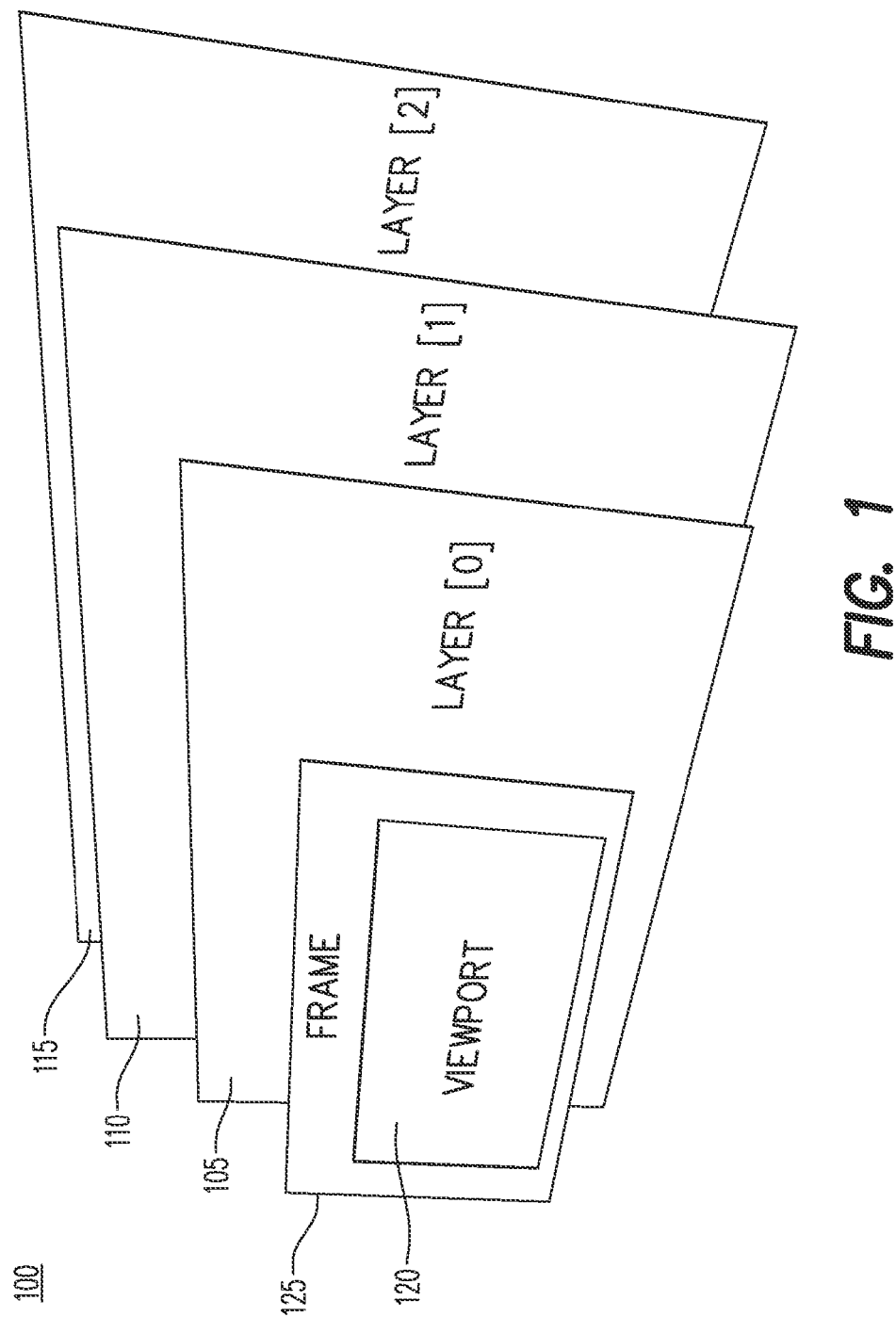
FIG. 1 is an illustrative depiction of a display environment including a user interface, according to some embodiments herein.

FIG. 1 is an illustrative depiction of a display environment 100. Display environment 100 may include a user interface comprising multiple layers. In the example of display environment 100, the user interface may comprise layer 105 (i.e., layer[0]), 110 (i.e., layer[1]), and 115 (i.e., layer[2]). While three layers are shown in FIG. 1, the number of layers comprising a user interface in the present disclosure is not, generally, limited or bound to any specific number of layers. In some embodiments, each layer may include one or more user interface elements. The user interface elements may include a variety of user interface icons, controls, text, data structure representations, and other indicia, without limit herein. The user interface elements may be associated with a particular layer by, for example, being placed in or on, contained in or on, pinned to, anchored to, and otherwise coupled to a user interface layer. In general, the present disclosure may refer to user interface elements and other entities as being contained by a layer since the user interface layers herein may act as a container for the user interface elements. In some embodiments, a layer may contain another layer.

Display environment 100 further includes a viewport 120. Viewport 120 provides a port or area that allows a visible view onto the multiple layers comprising display environment 100. Viewport 120 provides an opening or "window" through which at least a portion of the multiple layers 105, 110, and 115 of the user interface of FIG. 1 may be viewed. In some embodiments, one or more of the multiple layers of a user interface herein may extend beyond the boundaries of the viewport opening (i.e., a viewing range of viewport 120). As an example, a portion or subset of a layer of a user interface herein may be visible through a viewport in some embodiments, as opposed to all or a full extent of the entire layer (e.g., 105, 110, and 115). As illustrated in FIG. 1, the dimensions of a layer may be larger than the port opening of viewport 120.

In some embodiments, viewport 120 may have a frame 125 associated with the viewport. Frame 125 may be coupled to a periphery of the viewport. In some aspects, the frame may encompass the viewport, as illustrated in FIG. 1. In some other embodiments, the frame may surround a portion of the viewport where the portion is less than the entire periphery of the viewport. In some embodiments, frame 125 may provide an anchor point for one or more user interface elements. In some aspects, a user interface element anchored to frame 125 may provide a control that may be invoked when viewing one or more of the multiple layers 105, 110, and 115 through viewport 120. In some aspects, a user interface associated with viewport 120 and anchored to or contained by frame 125 may be "active" for one or more of the multiple layers though not necessarily all of the layers 105, 110, and 115.

In some aspects herein, the multiple layers may be arranged in a stacked configuration. Layers 105, 110, and 115 are shown arranged in a stacked configuration, with layer[1] being on top of layer[2] and layer[0] being on top of layer[1]. Expressed another way, the layers of FIG. 1 are arranged with layer[1] behind layer[0] and layer[2] behind layer[1]. In some embodiments, portions of one layer (e.g., layer 105) may be arranged on top of, in front of, or otherwise obscure a portion of another layer (e.g., layer 110) as illustrated in FIG. 1. However, the multiple layers of a user interface herein need not overlap or otherwise obscure any part of the other multiple layers.

As illustrated in FIG. 1 the different layers 105, 110, and 115 are each depicted as a plane, albeit a plane capable of containing one or more user interface elements as discussed above. In some aspects, a particular layer may contain one or more discrete areas that are associated with the same plane.

In some embodiments, the multiple layers of the user interface may be moved relative to viewport 120. As such, the portion(s) or section(s) of the multiple layers visible through viewport 120 may be varied. In some instances, the multiple layers may be selectively moved relative to the viewport in response to a user activated action. In some embodiments, the multiple layers may be selectively moved relative to the viewport in response to a machine (e.g., a computer or processor-based device) invoked action or a combination of a user action and a machine action.

In some aspects, different portions of a layer may be configured to indicate that a particular portion of the layer is arranged for viewing through or in a viewport at any one time. For example, a number of related user interface elements such as icons, controls, and text may be grouped in a section of a layer and lend themselves to being viewed simultaneously in a viewport. In some aspects, even when one or more user interface elements contained by and grouped together in a section of a layer do lend themselves to being viewed simultaneously in a viewport, the layer may be selectively positioned relative to the viewport without limitations.

Figure 2:
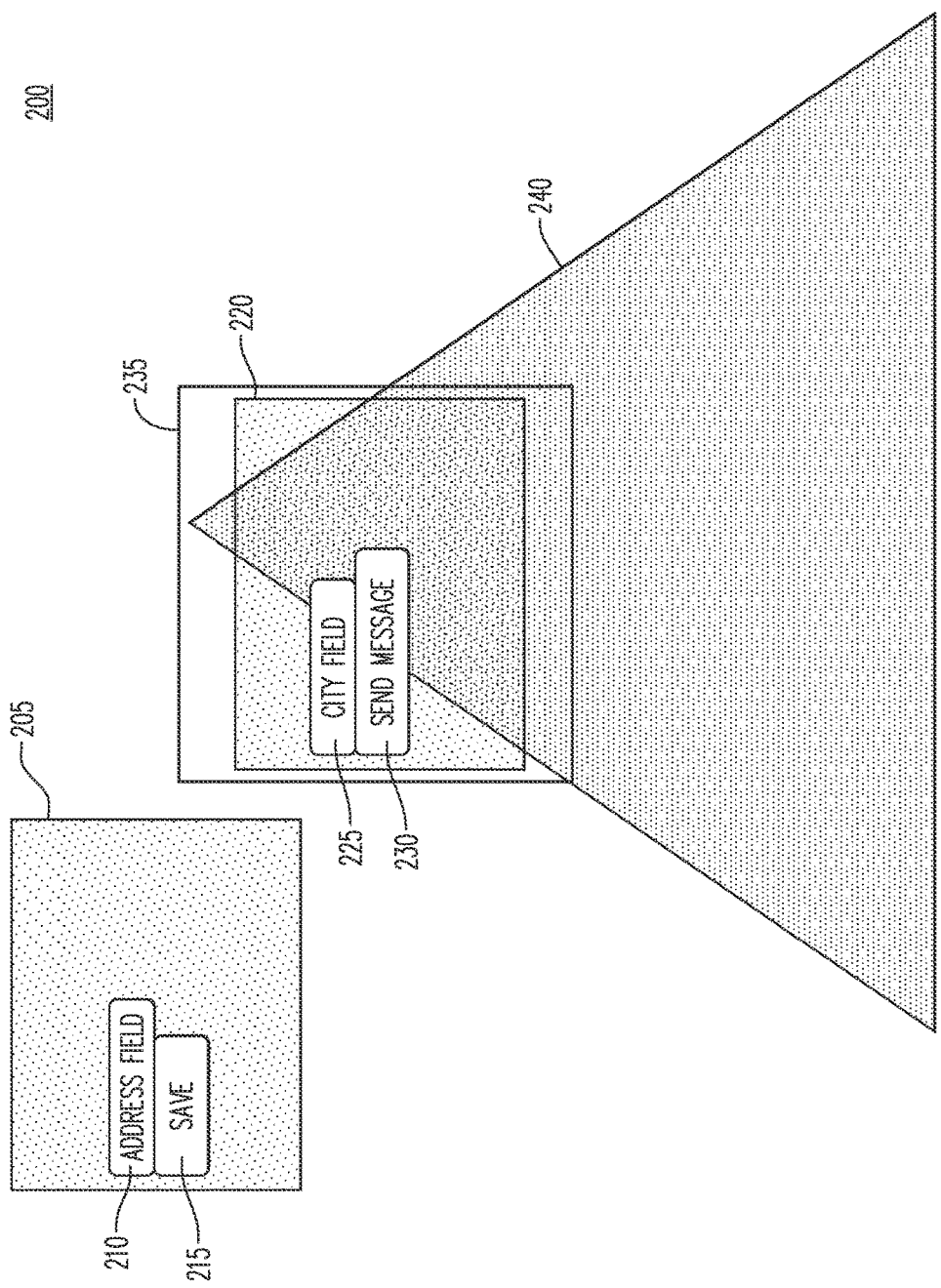
FIG. 2 is an illustrative depiction of various aspects of a user interface, according to some embodiments herein.

FIG. 2 provides an illustrative depiction of some aspects of a user interface 200 according to some embodiments herein. For example, user interface 200 includes two layers. A first layer includes area 205 having associated user interface elements 210 and 215, as well as area 220 having associated user interface elements 225 and 230. The second layer of user interface 200 includes area 240. In the example of FIG. 2, area 240 that may be a graphics image. Still referring to FIG. 2, a viewport 235 is shown providing a view therethrough of portions of the first and second layers of user interface 200. In particular, the first layer's area 220 including the associated user interface elements 225 and 230 and a portion of the second layer of user interface 200 including a part of area 240 are shown within the port opening of viewport 235.

As shown in FIG. 2, the first layer including area 220 is in front of or stacked on top of a part of the second layer including area 240. According to some aspects herein, those portions of the first layer area 220 not including user interface elements (e.g., 225 and 230) are displayed in a manner permitting the second (or another) layer to be at least partially visible. In the example of FIG. 2, the first layer is partially transparent in the areas devoid of user interface elements so that the second layer including area 240 is visible through the first layer when viewed through viewport 235.

In the example of FIG. 2, the first layer including area 220 is shown in front of or stacked on top of a part of the second layer including area 240. In some embodiments, the layering or stacking order of the multiple layers of a user interface herein may be reversed (i.e., inverted) or otherwise changed. In some aspects, the ordering of the layers may be selectively varied in response to a user action. In some aspects, the order of the layers may be varied in response to a machine invoked action. In some instances, the order of the first and second layers of FIG. 2 may be reversed or inverted such that the first layer including area 220 is moved behind of or under a part of the second layer including area 240.

In some embodiments, the order of any two layers of a user interface may be reversed or switched relative each other by selecting a control. For example, a foremost layer in a user interface may be switched with a bottommost layer in order to send the layer in the foreground to the background and bring the layer in the background to the foreground. In some embodiments, the aspects herein relating to varying or altering the configuration of the user interface layers may extend to user interfaces including more than two layers.

Figure 3A:
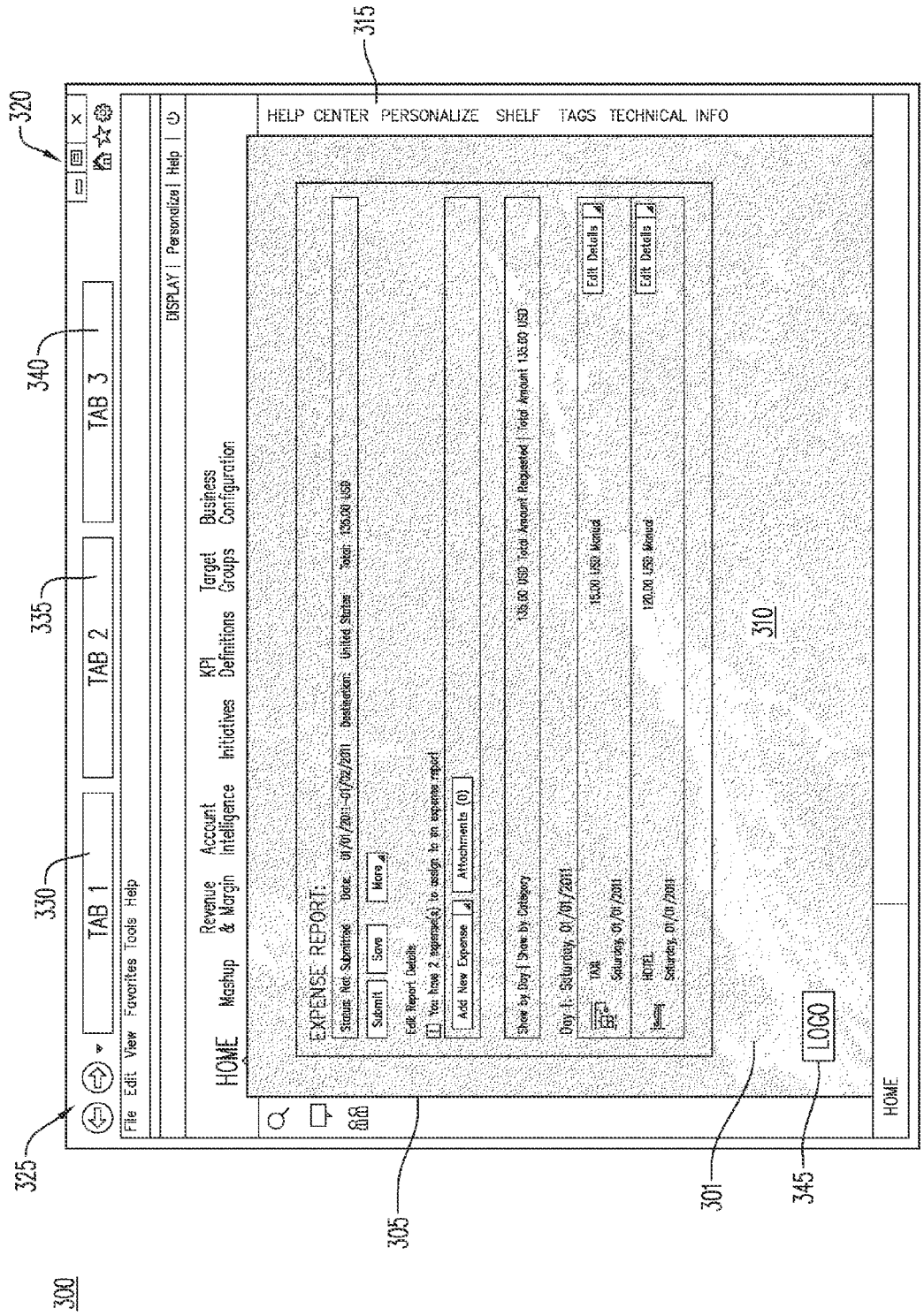
FIGS. 3A-3C depict, from an external view, various views of a user interface as a position of the multiple layers of the user interface change relative to a viewport, according to some embodiments herein.

FIG. 3A includes an illustrative depiction of a display environment including a user interface 300 from an external user perspective. In FIG. 3A, the display environment includes a viewport 305 that provides a view of user interface layer 310. As shown, layer 310 includes a number of user interface elements (e.g., a "report" including a number of user interface control elements). Also illustrated is a layer 301 comprising graphics (e.g., a mountain) behind layer 310. Within the open port of viewport 305, the graphics of layer 301 are visible through portions of layer 310 not including user interface elements.

Viewport 305 is surrounded by a frame 315. In the example of FIG. 3A, a number of user interface elements are anchored to the frame. For example, viewport 305, including frame 315 may be associated with or form part of browser. Frame 315 includes a number and variety of user control elements for navigating the user interface 300 of the depicted display environment. For example, frame 315 includes controls 320 to minimize, maximize, and close the viewport; navigational controls 325; and tabs 330, 335, and 340 for opening and navigating between multiple open user interface views (e.g., layers in some embodiments herein).

Also depicted in FIG. 3A is a user interface element, "logo" 345. In this instance, the "logo" 345 is shown positioned in the lower left-hand corner of user interface layer 310.

Figure 3B:
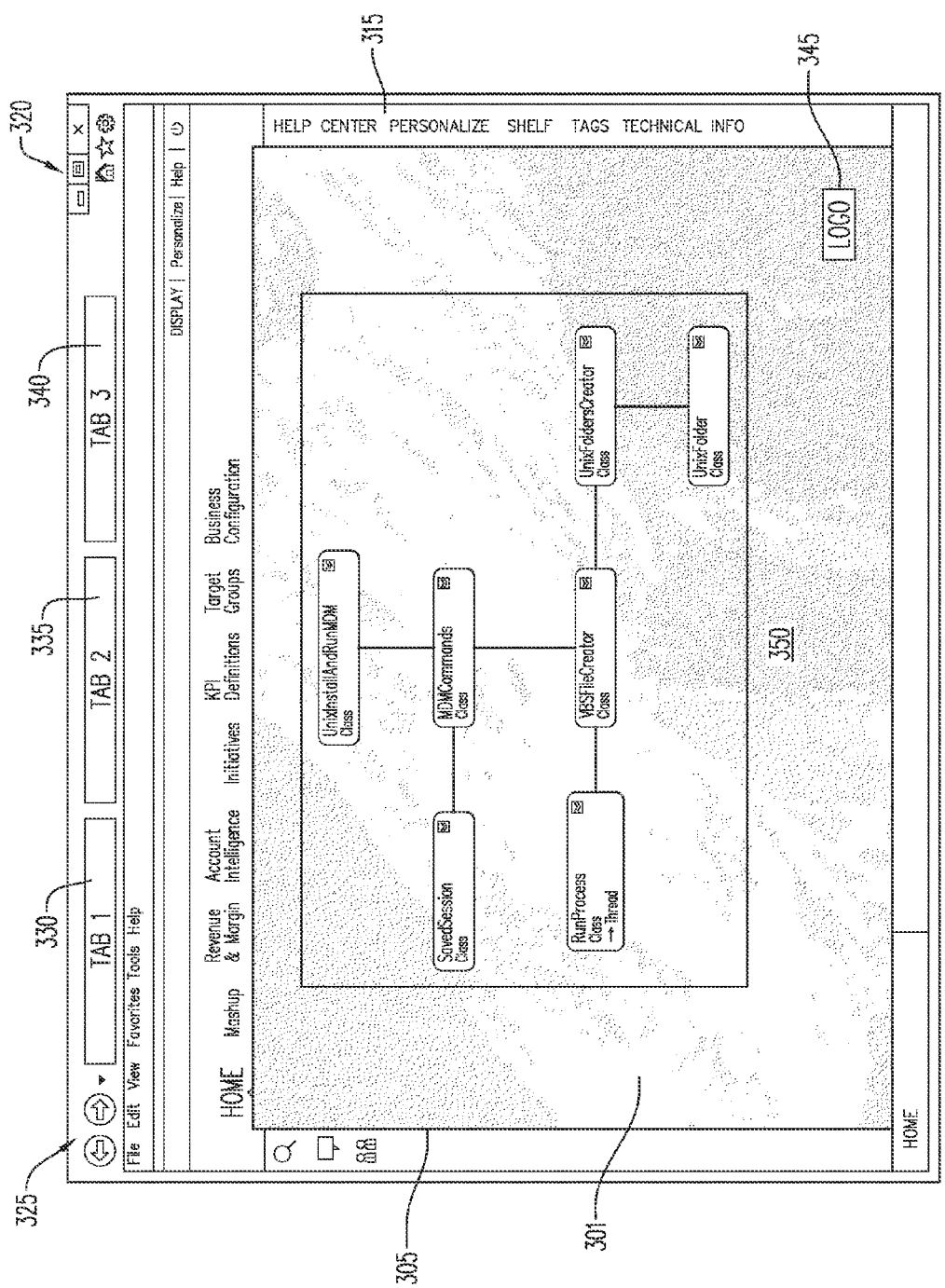

FIG. 3B is another depiction of the display environment including user interface 300 from an external user perspective. In FIG. 3B, the multiple layers of the user interface have moved relative to viewport 305 as compared to FIG. 3A. Accordingly, user interface layer 350 and a different portion of layer 301 are visible through viewport 305 in FIG. 3B. It is noted that while layer 350 in the foreground of FIG. 3B is dramatically different than layer 310 in FIG. 3A, the background graphic of layer 301 is changed relatively little as compared to FIG. 3A. In this manner, the user interface 300 may convey a sense of "depth" and visual appeal by altering, changing, or moving the multiple layers thereof at a different rate and/or direction between transitions from one user interface "view" (e.g., FIG. 3A) and another user interface "view (FIG. 3B).

It is noted that "logo" 345 is changed in location relative to viewport 305 in FIG. 3B as compared to its location in FIG. 3A. In some aspects, "logo" 345 may be contained by a separate layer other than layer 310 and layer 350. Accordingly, the movement of "logo" 345 may be defined and controlled independently than layers 310 and 350.

In some embodiments, the multiple layers of a user interface herein may be altered, changed, or moved at a different rate and/or direction between transitions from one user interface "view" to another "view", where the movement, direction, and other aspects of the different layers changed in a transition between user interface "views" may be varied independently of each other. That is, the transition(s) for each layer may be defined and executed for each individual layer of the multiple layers of the user interface herein, for some embodiments.

Figure 3C:
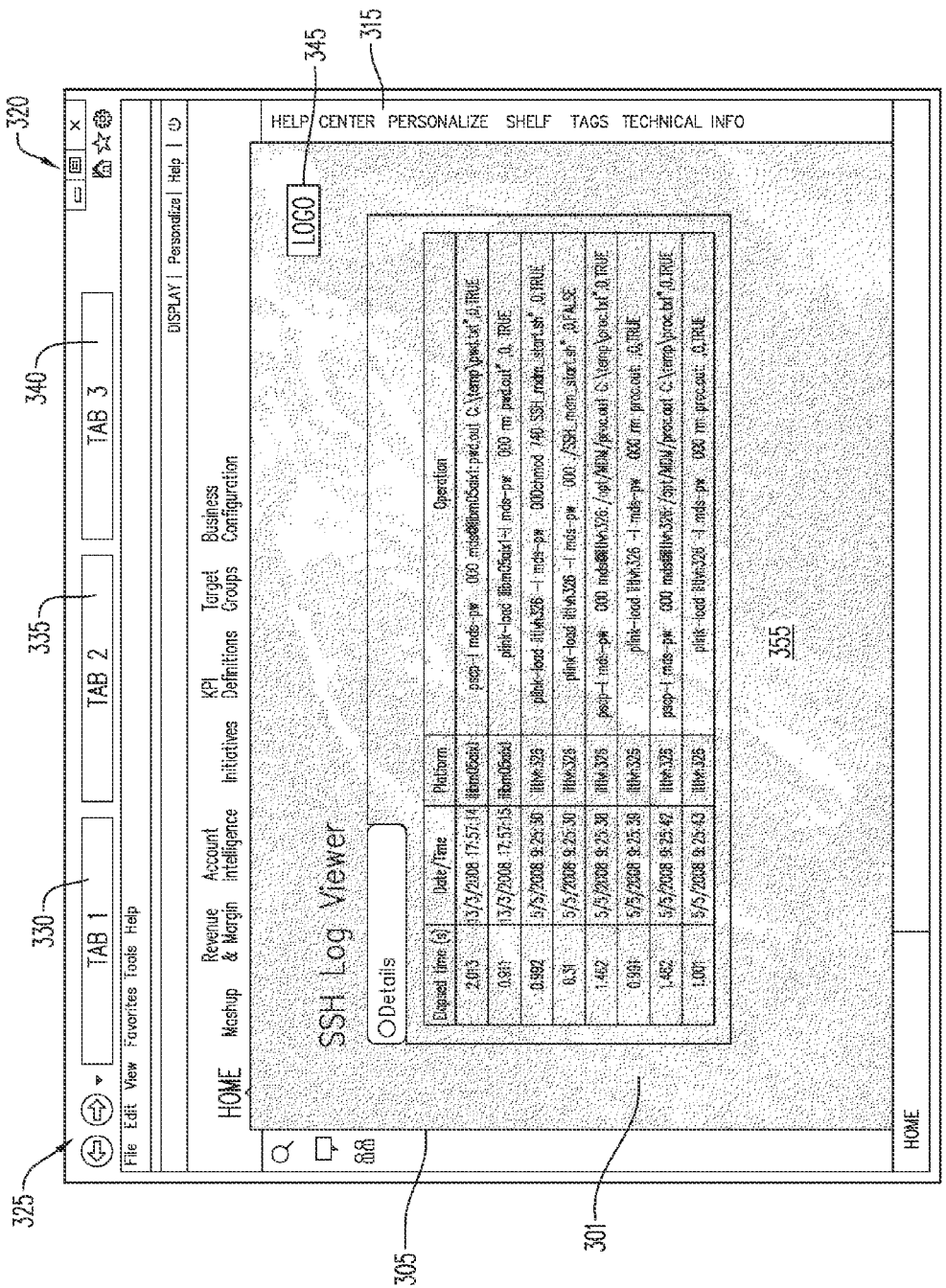

FIG. 3C is yet another depiction of the display environment including user interface 300 from an external user perspective. In FIG. 3C, the multiple layers of the user interface have again moved relative to viewport 305 as compared to FIGS. 3A and 3B. Accordingly, user interface layer 355 and a different portion of layer 301 are visible through viewport 305 in FIG. 3C. Here, layer 355 in the foreground of FIG. 3C is dramatically different than layer 350 in FIG. 3B and the background graphic layer 301 has changed relatively little as compared to FIG. 3B. Further, "logo" 345 is changed in location relative to viewport 305 of FIG. 3C as compared to its location in FIGS. 3A and 3B.

Figure 4A:
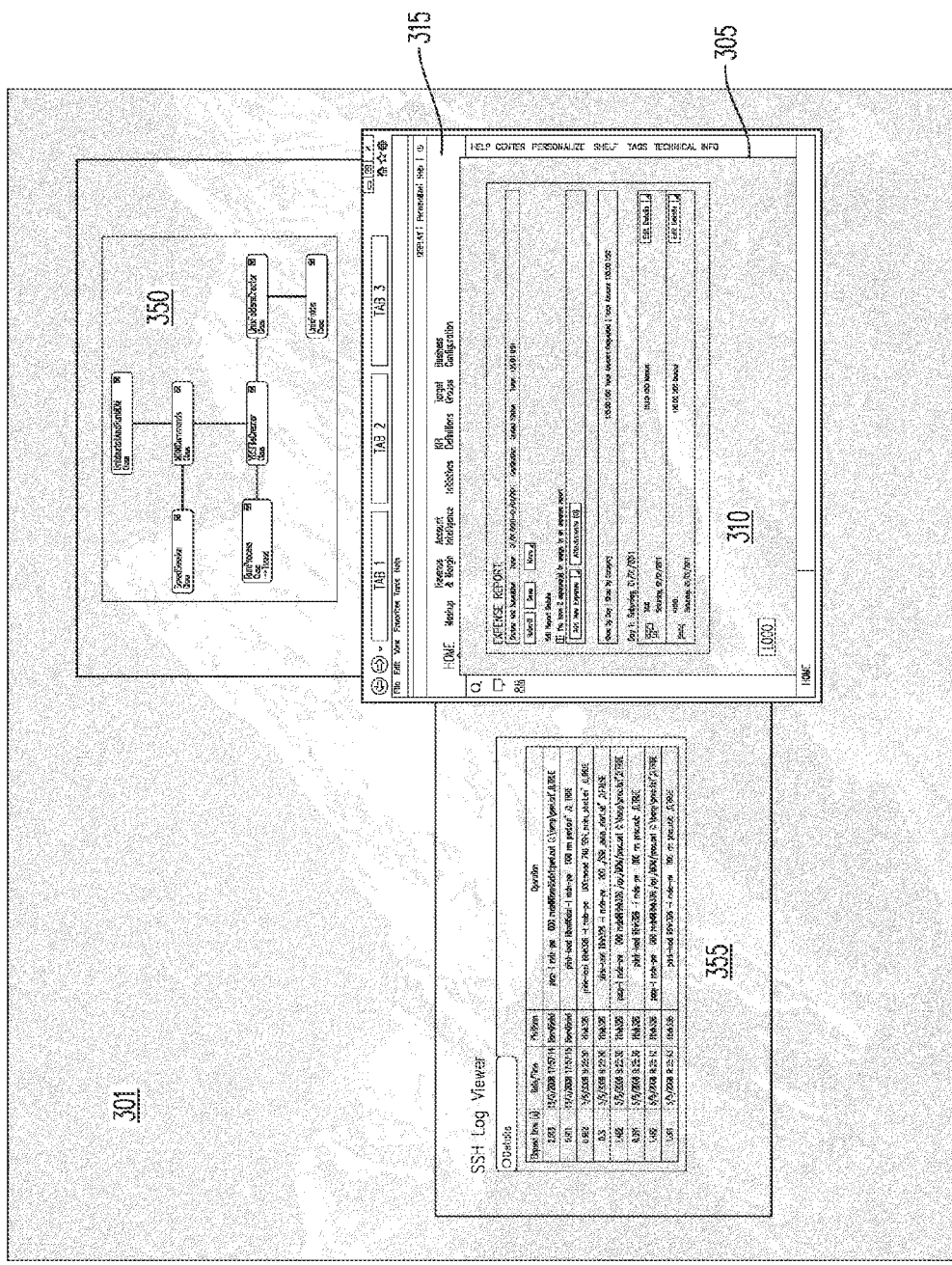
FIGS. 4A-4C depict, from an internal view, various views of the user interface of FIGS. 3A-4C, according to some embodiments herein.
Figure 4B:
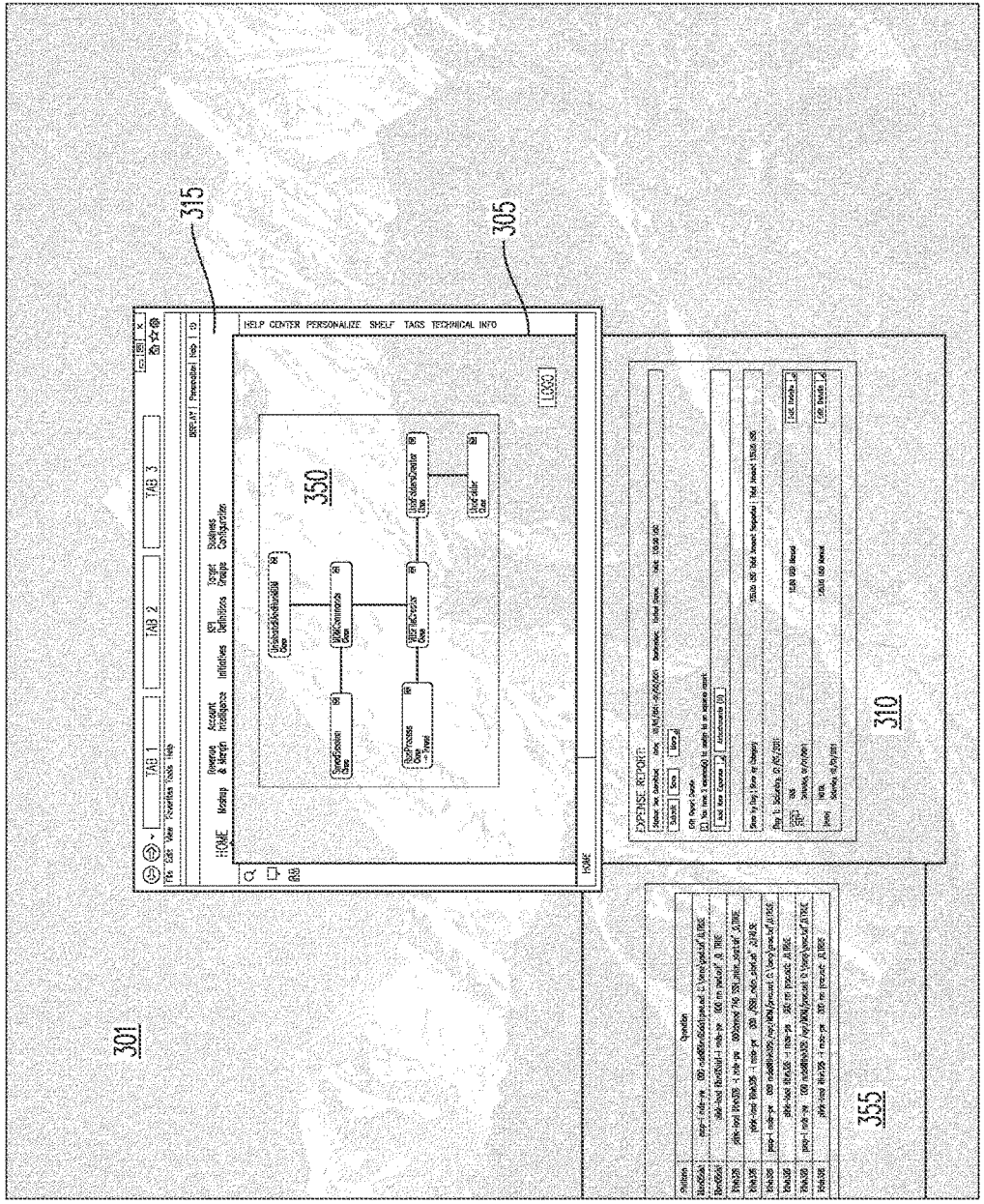
Figure 4C:
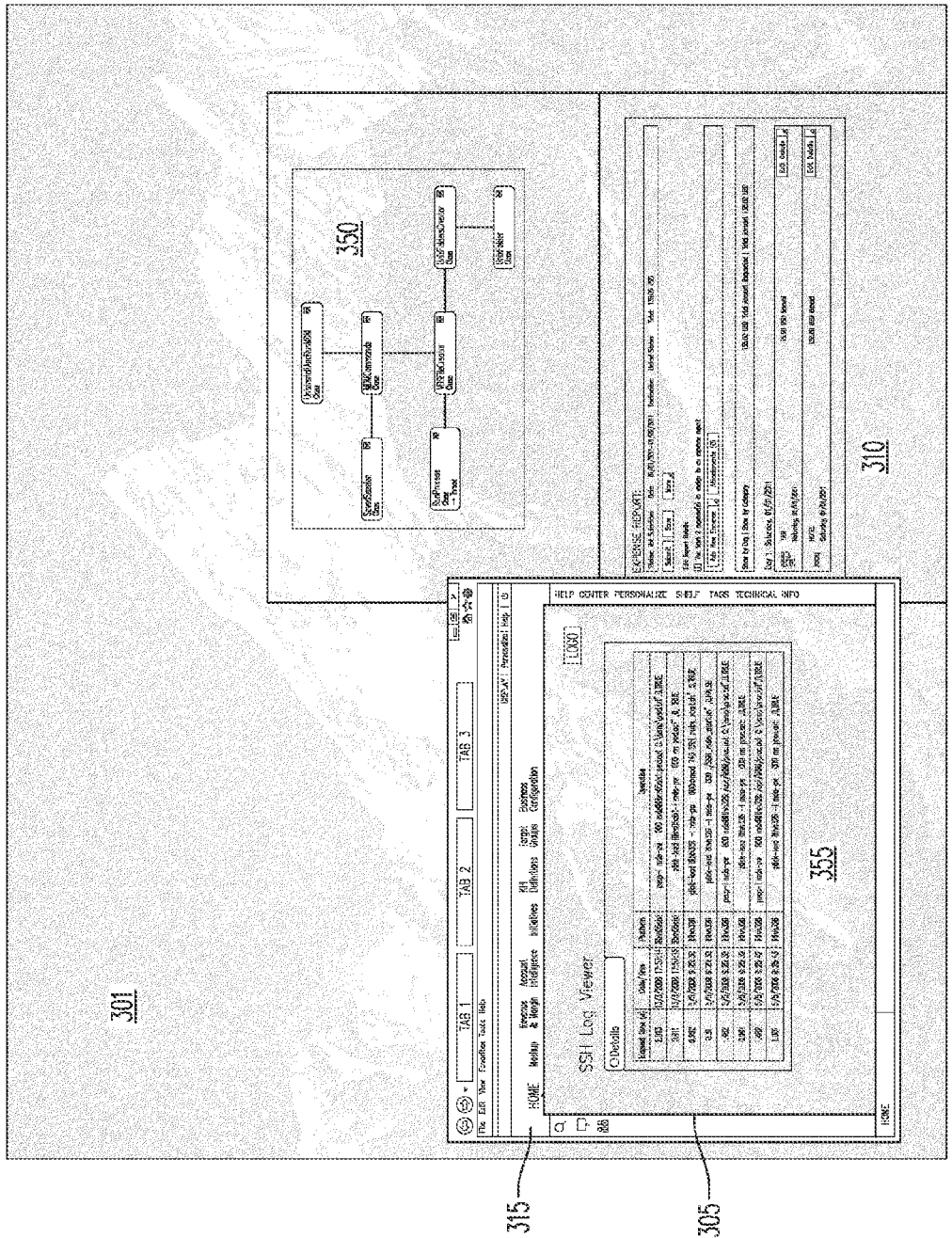

As stated above, FIGS. 3A-3C provide illustrative depictions of a display environment including the user interface 300 from an external user's perspective. FIGS. 4A-4C include illustrative depictions of the display environment of FIGS. 3A-3C including the user interface 300 from an internal perspective. In particular, FIGS. 4A-4C provide an illustrative depiction of how the multiple layers of the user interface moves relative to the viewport 305 as the display environment transitions from the "view" of FIG. 3A to the "view" of FIG. 3B and onto the "view" of FIG. 3C.

FIG. 4A shows the full extent of layer 301, as well as layers 310, 350, and 350. FIG. 4A corresponding to FIG. 3A, shows layer 310 positioned within viewport 305. That is, the multiple layers are moved relative to viewport 305 such that layer 310 is positioned in the open port of the viewport. Likewise, FIG. 4B corresponding to FIG. 3B, shows layer 350 positioned within viewport 305 and FIG. 4C corresponding to FIG. 3C, shows layer 350 positioned within viewport 305.

Figure 5:
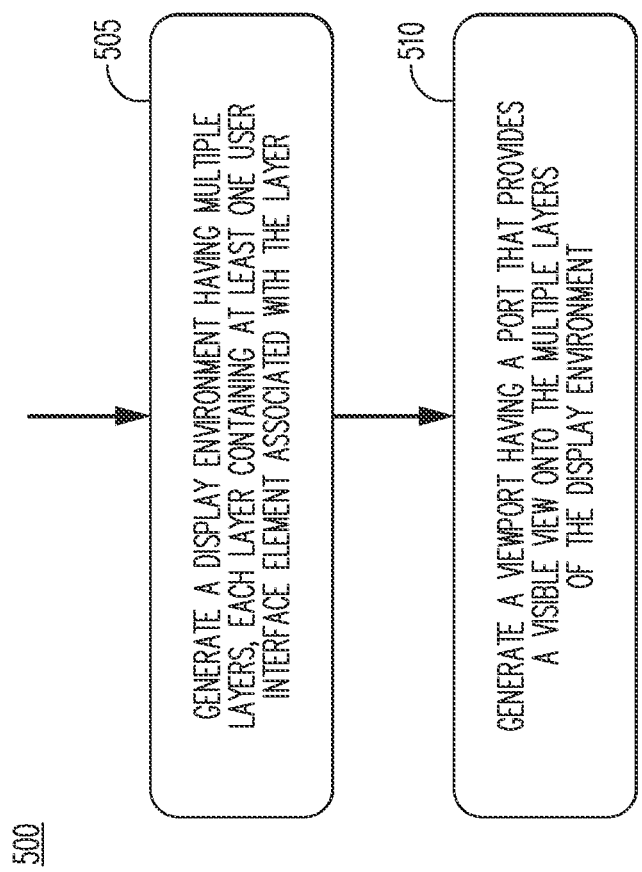
FIG. 5 is a flow diagram of a process, according to some embodiments herein.

FIG. 5 is a flow diagram of a process 500 in accordance with some embodiments herein. As indicated by the arrow leading to operation 505, process 500 may, in some instances, be a part of or be associated with other operations or processes. At operation 505, process 500 generates a display environment having multiple layers. The multiple layers may each contain at least one user interface element that is associated with and contained by the layer. In some aspects, the multiple layers may comprise a user interface such as, for example, those depicted in FIGS. 1, 2, 3A-3C, and 4A-4C herein. The multiple layers generated at operation 505 may include one or more of the characteristics discussed at length above with respect to the foregoing examples. As such, such details are not repeated again here.

Operation 510 includes generating a viewport having a port that provides a visible view onto the multiple layers of the display environment. As also discussed hereinabove, the viewport may include a frame coupled to and associated therewith.

In some embodiments, the order of the operations of process 500 is not limited by the configuration of FIG. 5. Accordingly, operations 505 and 510 (as well as other processes herein) may be executed in any order, including simultaneously and concurrently in some embodiments.

Figure 6:
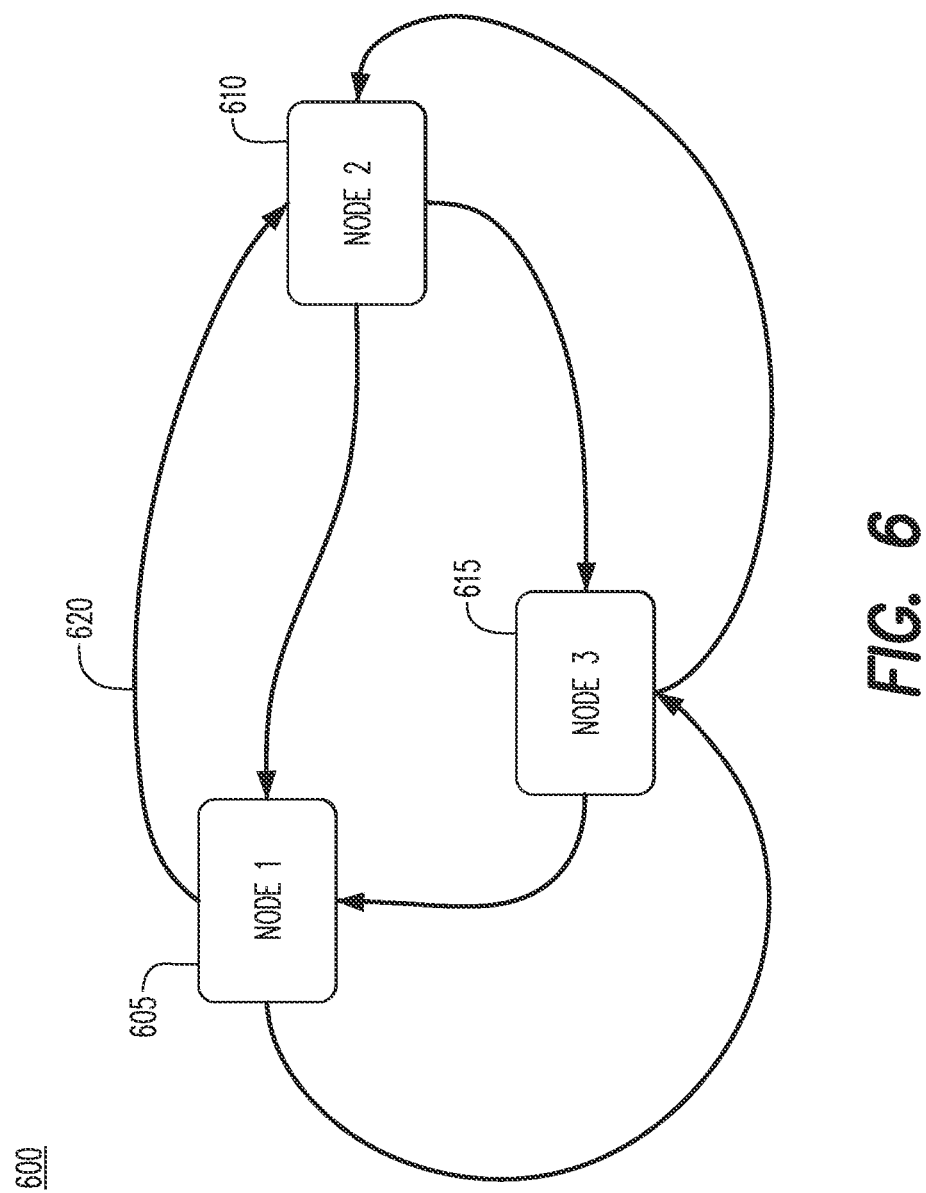
FIG. 6 is an illustration of a node graph associated with a user interface, according to some embodiments herein.

FIG. 6 is an illustrative depiction of a node graph 600. In some embodiments, each of the multiple layers of a user interface herein has a node graph associated with the layer. In accordance with aspects herein, the node graph associated with each layer may define the event(s) that trigger or otherwise invoke a transition of a layer between different "views", as well as the intermediate steps executed by the layer in the transition between the different "views".

Node graph 600 is an example node graph including three nodes 605 (Node 1), 610 (Node 2), and 615 (Node 1). Additionally, node graph 600 includes "edges" between the nodes indicating a permissible path the layer moves along from one node to another. As illustrated in FIG. 6, the layer associated with node graph 600 may move from any of the three nodes 605, 610, and 615 to any of the other three illustrated nodes. In some instances, a layer may be limited to the nodes it can transition between. In these instances, the node graph would indicate the permissible paths.

In some aspects, the path between nodes is independently defined for the layer with which the node graph is associated. In particular, each path (i.e., "edge") defines the transition events that trigger a layer to move from one node to another. Each path further defines a function for calculating the intermediate steps between nodes as the layer transitions from one "view" to a next "view". In some aspects, the trigger event and the function that determines the intermediate steps between nodes as the layer transitions from one "view" to a next "view" may be determined individually and independently for each layer and for each transition.

In some embodiments, the function defined for transition steps, actions, and other rendering aspects of a layer as the layer transitions from one "view" to a next "view" may be customized or developed specifically for the layer, for that particular transition. In this manner, different layers may move by different amounts and/or at different rates between "views" (i.e., screens) and/or with other different/same effects as a user interface including the different multiple layers transitions from one "view" (e.g., Node 1) to another "view" (e.g., Node 2).

In some aspects, the events that trigger a transition from one "view" to another "view" may be a user action or a machine invoked action. In some aspects, a user action such as the selection of a user interface action by any method now known or that becomes known may call a computer to invoke a process to cause a user interface having multiple layers in accordance with aspects herein to transition from a first "view" to a second "view".

In some embodiments, a function defined for each path controls a movement of the layer for the associated transition path between nodes of the node graph. In some aspects, the movement may include, for example, a rate of the movement, a direction of the movement, a start and stop position of the movement, the duration of the transition, and the number of steps comprising the movement. In some embodiments, other, more, fewer, and different aspects of the movement may be defined by the path functions associated with each transition of the node graph. In some aspects, the intermediate steps defined by the path function may determine layer rendering aspects such as, for example, an animation path, pop-in/pop-out elements, and other user interface effects.

In some embodiments, the node graphs associated with multiple layers of a user interface may be defined during a development phase of an application, service, or deliverable product. In some instances, a node graph associated with one or more of the multiple layers of a user interface herein may be further (fine) tuned or altered after the application, service, or product embodying a user interface herein is deployed. In some embodiments, such further modification of the node graph(s) may be permitted or allowed on a limited basis and/or with limited controls.

Figure 7:
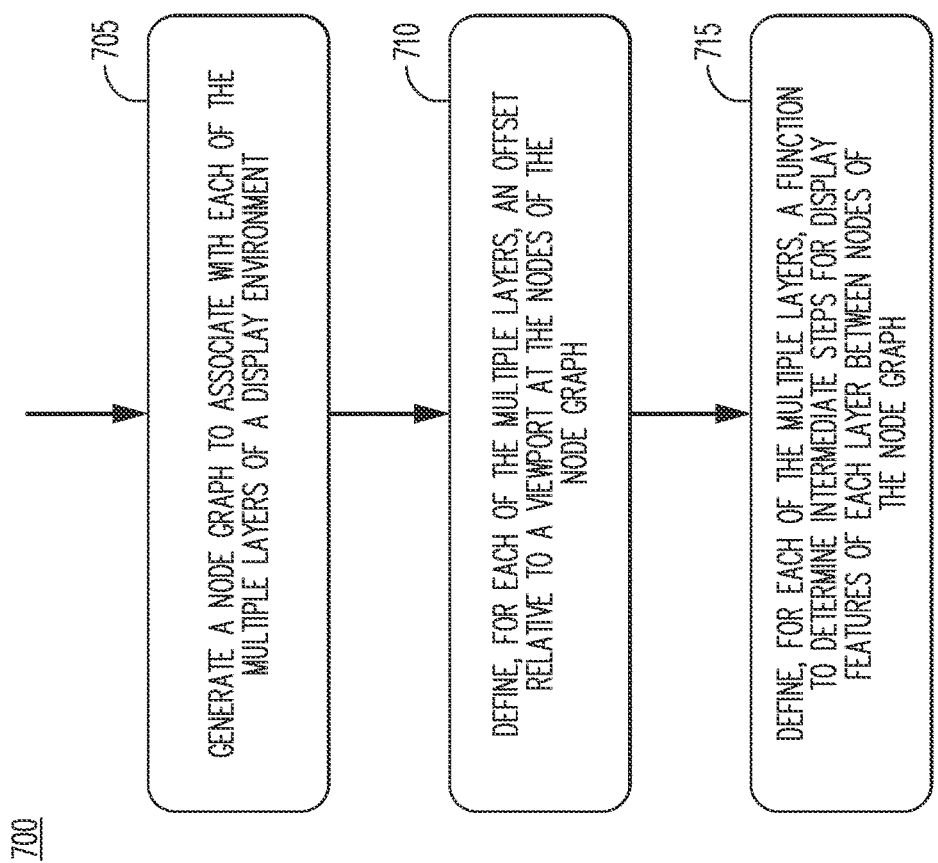
FIG. 7 is a flow diagram of a process related to a node graph, according to some embodiments herein.

FIG. 7 is a flow diagram of a process 700 in accordance with some embodiments herein. As indicated by the arrow leading to operation 705, process 700 may, in some instances, be a part of or be associated with other operations or processes. At operation 705, process 700 generates a node graph to associate with each of the multiple layers of a user interface of a display environment, according to some embodiments herein. In some embodiments, the generation of a node graph in process 700 may further include the aspects of operations 710 and 715.

At operation 710, an offset of the layer associated with the node graph of operation 705 relative to the viewport of the user interface at the nodes of the viewport is defined. The position or offset of the layer relative to the viewport at the nodes determines what is visible through the port of the viewport or presented to a user in a "view" of the user interface at each node (e.g., Node 1, 605). The offset may be expressed in any manner now known or that becomes known for expressing user interface display characteristics.

At operation 715, a function to define the intermediate steps for rendering the display features of the layer associated with the node graph of operation 705 is defined. The function defined at operation 715 may be expressed in mathematical or other formats. In particular, the function operates to define the intermediate steps for rendering the display features of the layer associated with the node graph of operation 705 between the nodes of the node graph.

In some embodiments, a layer may remain visible at all times or substantially all times in the "view" provided via the viewport of a user interface herein. In some instances, such a layer may be provided to present error or other types of messages. By remaining visible in the viewport at all times, the error or other type of messages may be consistently visible to a user, while the user is viewing any and all of the multiple layers of the user interface. In some embodiments, the error or other type of messaging provided in the separate layer discussed in the present example may be provided independently of any type of pop-ups/pop-ins and other messages that may be associated with any other layers of the user interface.

In some aspects, the user interface including multiple layers as disclosed herein may be implemented, executed, and operated independent of any particular programming language, operating system, communication protocol, and system, service, or device platform.

All systems and processes discussed herein may be embodied in program code stored on one or more computer-readable media. Such media may include, for example, a floppy disk, a CD-ROM, a DVD-ROM, magnetic tape, and solid state Random Access Memory (RAM) or Read Only Memory (ROM) storage units. According to some embodiments, a memory storage unit may be associated with access patterns and may be independent from the device (e.g., magnetic, optoelectronic, semiconductor/solid-state, etc.) Moreover, in-memory technologies may be used such that databases, etc. may be completely operated in RAM memory at a processor. Embodiments are therefore not limited to any specific combination of hardware and software.

Figure 8:
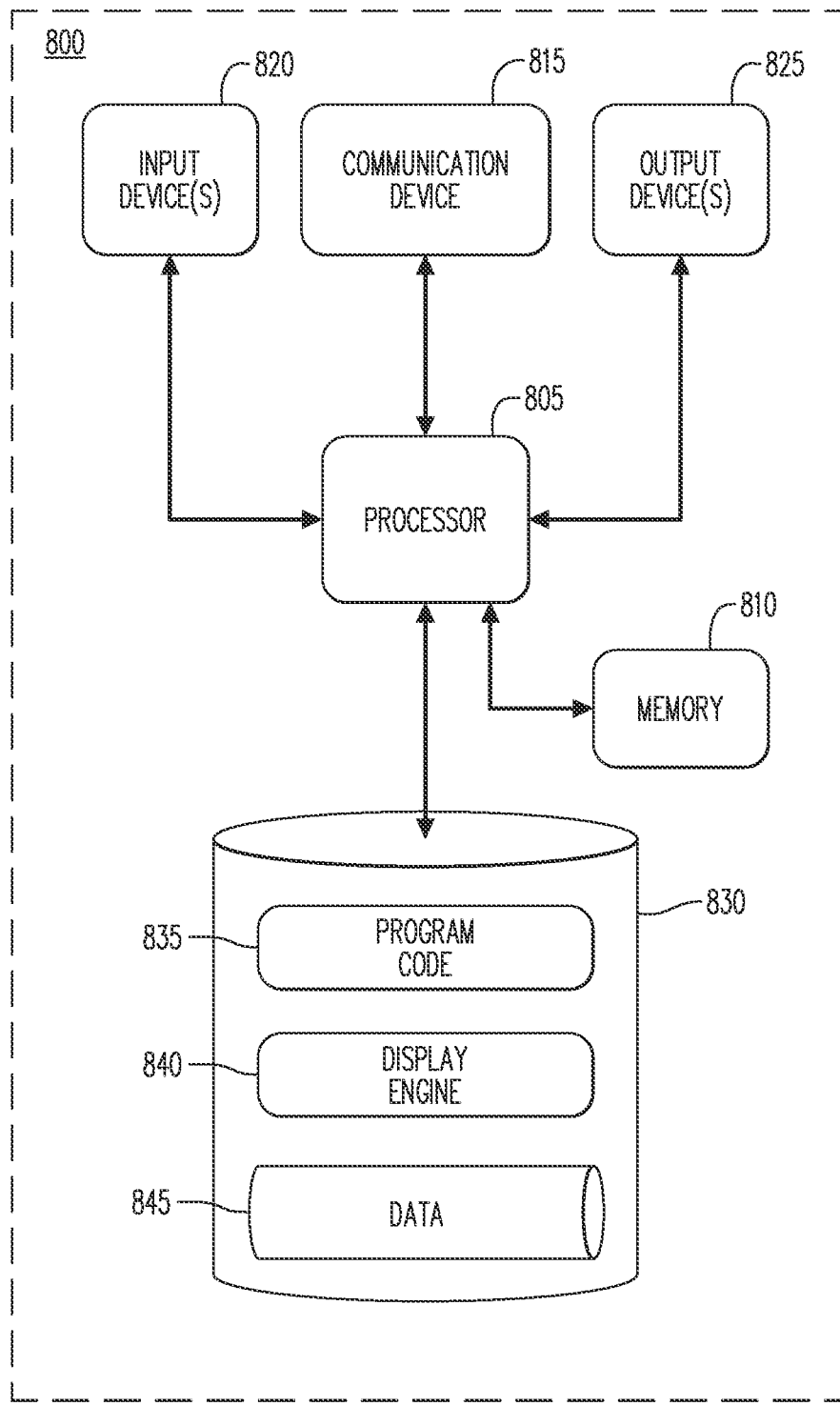
FIG. 8 is a block diagram of an apparatus, according to some embodiments.

FIG. 8 is a block diagram overview of a system or apparatus 800 according to some embodiments. System 800 may be, for example, associated with any device to implement the methods and processes described herein, including for example client devices and a server of a business service provider that provisions software products. System 800 comprises a processor 805, such as one or more commercially available Central Processing Units (CPUs) in the form of one-chip microprocessors or a multi-core processor, coupled to a communication device 815 configured to communicate via a communication network (not shown in FIG. 8) to another device or system. In the instance system 800 comprises an application server, communication device 815 may provide a means for system 800 to interface with a client device. System 800 may also include a local memory 810, such as RAM memory modules. The system 800 further includes an input device 820 (e.g., a touch screen, mouse and/or keyboard to enter content) and an output device 825 (e.g., a computer or other device monitor/screen to display a user interface including multiple layers).

Processor 805 communicates with a storage device 830. Storage device 830 may comprise any appropriate information storage device, including combinations of magnetic storage devices (e.g., a hard disk drive), optical storage devices, and/or semiconductor of solid state memory devices. In some embodiments, storage device may comprise a database system.

Storage device 830 stores a program code 835 that may provide computer executable instructions for processing requests from, for example, client devices in accordance with processes herein. Processor 805 may perform the instructions of the program 835 to thereby operate in accordance with any of the embodiments described herein. Program code 835 may be stored in a compressed, uncompiled and/or encrypted format. Program code 835 may furthermore include other program elements, such as an operating system, a database management system, and/or device drivers used by the processor 805 to interface with, for example, peripheral devices. Storage device 830 may also include data 845. Data 845, in conjunction with display engine 640, may be used by system 800, in some aspects, in performing the processes herein, such as processes 500 and 700.

All systems and processes discussed herein may be embodied in program code stored on one or more computer-readable media. Such media may include, for example, a floppy disk, a CD-ROM, a DVD-ROM, one or more types of "discs", magnetic tape, a memory card, a flash drive, a solid state drive, and solid state Random Access Memory (RAM) or Read Only Memory (ROM) storage units. Embodiments are therefore not limited to any specific combination of hardware and software.

Embodiments have been described herein solely for the purpose of illustration. Persons skilled in the art will recognize from this description that embodiments are not limited to those described, but may be practiced with modifications and alterations limited only by the spirit and scope of the appended claims

What is claimed is:

1. A computer-implemented method, the method comprising:
    generating a user interface display environment having multiple layers, each layer containing at least one user interface element associated with the layer;
    generating a viewport having a port that provides a visible view onto the multiple layers of the display environment, each of the multiple layers having an offset relative to the viewport;
    associating a node graph with each of the multiple layers, the node graph defining for each of the multiple layers:
        the offset relative to the viewport at nodes of the node graph, and
        a function to determine intermediate steps for display features of each layer between the nodes of the node graph; and
    moving, between a transition from a first visible view through the viewport to a second visible view through the viewport, the multiple layers relative to the viewport to provide a visible view onto different portions of the multiple layers of the display environment, wherein the movement of at least two different layers of the multiple layers is varied independently of each other with respect to a rate of movement and a direction of movement.

2. The method of claim 1, wherein the viewport includes a frame surrounding at least a portion of a periphery of the viewport.

3. The method of claim 2, wherein the frame of the viewport provides an anchor for at least one user interface element.

4. The method of claim 1, wherein at least one of the multiple layers is contained in another one of the multiple layers.

5. The method of claim 1, wherein, for any one of the multiple layers, the function to determine intermediate steps for display features of each layer between nodes of the node graph is independent of another of the multiple layers.

6. The method of claim 1, wherein one of the multiple layers is always visible through the port of the viewport.

7. A non-transitory medium having processor-executable instructions stored thereon, the medium comprising:
   instructions to generate a user interface display environment having multiple layers, each layer containing at least one user interface element associated with the layer;
   instructions to generate a viewport having a port that provides a visible view therethrough onto the multiple layers of the display environment, each of the multiple layers having an offset relative to the viewport;
   instructions to associate a node graph with each of the multiple layers, the node graph defining for each of the multiple layers:
      the offset relative to the viewport at the nodes of node graph, and
      a function to determine intermediate steps for display features of each layer between the nodes of the node graph; and
   instructions to move, between a transition from a first visible view through the viewport to a second visible view through the viewport, the multiple layers relative to the viewport to provide a visible view onto different portions of the multiple layers of the display environment, wherein the movement of at least two different layers of the multiple layers is varied independently of each other with respect to a rate of movement and a direction of movement.

8. The medium of claim 7, wherein the viewport includes a frame surrounding at least a portion of a periphery of the viewport.

9. The medium of claim 8, wherein the frame of the viewport provides an anchor for at least one user interface element.

10. The medium of claim 7, wherein at least one of the multiple layers is contained in another one of the multiple layers.

11. The medium of claim 7, wherein, for any one of the multiple layers, the function to determine intermediate steps for display features of each layer between nodes of the node graph is independent of another of the multiple layers.

12. The medium of claim 7, wherein one of the multiple layers is always visible through the port of the viewport.

13. A system comprising:
   a memory having processor-executable instructions stored thereon; and
   a processor to execute the processor-executable instructions to cause the system to:
      generate a user interface display environment having multiple layers, each layer containing at least one user interface element associated with the layer;
      generate a viewport having a port that provides a visible view therethrough onto the multiple layers of the display environment, each of the multiple layers having an offset relative to the viewport;
      associating a node graph with each of the multiple layers, the node graph defining for each of the multiple layers:
         the offset relative to the viewport at the nodes of node graph, and
         a function to determine intermediate steps for display features of each layer between the nodes of the node graph; and
      move, between a transition from a first visible view through the viewport to a second visible view through the viewport, the multiple layers relative to the viewport to provide a visible view onto different portions of the multiple layers of the display environment, wherein the movement of at least two different layers of the multiple layers is varied independently of each other with respect to a rate of movement and a direction of movement.

14. The system of claim 13, wherein the viewport includes a frame surrounding at least a portion of a periphery of the viewport.

15. The system of claim 14, wherein the frame of the viewport provides an anchor for at least one user interface element.

16. The system of claim 13, wherein at least one of the multiple layers is contained in another one of the multiple layers.

17. The system of claim 13, wherein, for any one of the multiple layers, the function to determine intermediate steps for display features of each layer between nodes of the node graph is independent of another of the multiple layers.

18. The system of claim 13, wherein one of the multiple layers is always visible through the port of the viewport.

* * * * *